US011888262B2

(12) United States Patent
Peterson et al.

(10) Patent No.: US 11,888,262 B2
(45) Date of Patent: Jan. 30, 2024

(54) AUTOMOTIVE ELECTRICAL CONNECTOR FEATURES FOR ROBOTIC INSTALLATION

(71) Applicant: APTIV TECHNOLOGIES LIMITED, St. Michael (BB)

(72) Inventors: David R. Peterson, Aurora, OH (US); Joseph Sudik, Jr., Niles, OH (US); Duane Lee Brantingham, Cortland, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/118,708

(22) Filed: Dec. 11, 2020

(65) Prior Publication Data

US 2021/0210905 A1 Jul. 8, 2021

Related U.S. Application Data

(60) Provisional application No. 62/956,848, filed on Jan. 3, 2020.

(51) Int. Cl.
*H01R 13/64* (2006.01)
*B25J 15/04* (2006.01)
(Continued)

(52) U.S. Cl.
CPC .............. *H01R 13/64* (2013.01); *B25J 15/04* (2013.01); *H01B 7/0045* (2013.01);
(Continued)

(58) Field of Classification Search
CPC .. H01R 13/64; H01R 13/642; H01R 13/6453; H01R 13/6456; H01R 13/526;
(Continued)

(56) References Cited

U.S. PATENT DOCUMENTS

| 4,664,588 A * | 5/1987 | Newell ................. B23Q 1/0063 294/86.4 |
| 6,019,617 A * | 2/2000 | Liu ....................... H01R 13/447 439/135 |

(Continued)

FOREIGN PATENT DOCUMENTS

EP 1488893 A2 12/2004

OTHER PUBLICATIONS

European Search Report dated May 21, 2021. 7 pages.

*Primary Examiner* — Harshad C Patel
(74) *Attorney, Agent, or Firm* — Miller Johnson (57) ABSTRACT

An electrical connector comprises a housing defining an outer surface, a wire cable at least partially disposed in the housing, and a robotic installation feature at least temporarily attached to or defined in the outer surface of the housing, wherein the robotic installation feature defines a slot that is configured to be interacted with by an end effector of a robotic installer during robotic installation of the electrical connector with a corresponding electrical connector. A method of robotic installation of the electrical connector comprises identifying the robotic installation feature, inserting at least two members of the end effector into the slot, expanding the at least two members of the end effector along at least one of two axes to thereby fix the at least two members therein and obtain movable control of the electrical connector, and installing the electrical connector with the corresponding electrical connector.

18 Claims, 4 Drawing Sheets

(51) Int. Cl.
  *H01B 7/00* (2006.01)
  *H01R 13/502* (2006.01)
  *H01R 13/516* (2006.01)
  *H01R 13/58* (2006.01)
  *H01R 13/631* (2006.01)
(52) U.S. Cl.
  CPC ......... *H01R 13/502* (2013.01); *H01R 13/516* (2013.01); *H01R 13/58* (2013.01); *H01R 13/6315* (2013.01)
(58) Field of Classification Search
  CPC .... H01R 13/512; H01R 13/465; H01R 13/46; H01R 13/50; H01R 13/58; H01R 13/6315; B25J 15/04; B25J 15/0408; H01B 7/0045
  See application file for complete search history.

(56) References Cited

U.S. PATENT DOCUMENTS

| | | | | |
|---|---|---|---|---|
| 6,116,949 A * | 9/2000 | Costello | ............ | H01R 13/6485 439/509 |
| 6,655,970 B2 * | 12/2003 | Tsai | ............ | H05K 7/1007 439/135 |
| 6,877,990 B2 * | 4/2005 | Liao | ............ | H01R 12/88 439/41 |
| 6,899,553 B2 * | 5/2005 | Ma | ............ | H05K 7/1061 439/135 |
| 7,070,443 B2 * | 7/2006 | Tashiro | ............ | F21V 21/002 439/419 |
| 7,182,620 B1 * | 2/2007 | Ju | ............ | H01R 12/88 439/331 |
| 8,066,524 B2 * | 11/2011 | Burbank | ............ | C12P 7/065 439/247 |
| 8,142,200 B2 * | 3/2012 | Crunkilton | ............ | A61N 7/02 439/21 |
| 8,439,693 B2 * | 5/2013 | Yeh | ............ | H01R 12/88 439/135 |
| 8,585,420 B2 * | 11/2013 | Burbank | ............ | C10J 3/721 439/247 |
| 9,826,445 B2 * | 11/2017 | Brisebois | ............ | H04W 36/023 |
| 10,205,266 B1 * | 2/2019 | Peterson | ............ | H01R 13/516 |
| 10,355,409 B2 | 7/2019 | Peterson et al. | | |
| 10,973,594 B2 * | 4/2021 | Crawford | ............ | A61B 34/20 |
| 2007/0142971 A1 * | 6/2007 | Schena | ............ | A61B 34/71 700/251 |
| 2012/0039444 A1 * | 2/2012 | Baic | ............ | G21K 1/02 378/147 |
| 2012/0124824 A1 * | 5/2012 | Burbank | ............ | A61B 34/70 29/700 |
| 2015/0162693 A1 * | 6/2015 | Ng | ............ | H01R 13/5812 439/586 |

* cited by examiner

AUTOMOTIVE ELECTRICAL CONNECTOR FEATURES FOR ROBOTIC INSTALLATION

CROSS-REFERENCE TO RELATED APPLICATION(S)

The present application claims the benefit of U.S. Provisional Application No. 62/956,848, filed on Jan. 3, 2020. The disclosure of this application is incorporated herein by reference in its entirety.

FIELD

The present disclosure generally relates to automotive electrical connectors and, more particularly, to connector features for robotic installation.

BACKGROUND

An electrical connector typically comprises a housing having at least a portion of a wire cable disposed therein. The electrical connector is electrically connected to another electrical system (e.g., a corresponding electrical connector) and the connection is secured by a connector position assurance (CPA) feature (a clip, a latch, etc.). Manual installation of electrical connectors by a human installer can be time consuming and costly, particularly for less experienced human installers and for more complex installation projects. Automated installation by a robotic installer may be preferable to manual human installation due to increased speed and decreased costs. The robotic installer, however, must be able to accurately identify the electrical connector and obtain movable control of it in order to complete the robotic installation. Complex visual scanning systems could be utilized by the robotic installer, but this could further increase costs. Accordingly, while conventional electrical connectors and conventional robotic installers work well for their intended purpose, an opportunity exists for improvement in the art of robotic installation of electrical connectors.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an electrical connector is presented. In one exemplary implementation, the electrical connector comprises: a housing defining an outer surface, a wire cable at least partially disposed in the housing, and a robotic installation feature at least temporarily attached to or defined in the outer surface of the housing, wherein the robotic installation feature defines a slot that is configured to be interacted with by an end effector of a robotic installer during robotic installation of the electrical connector with a corresponding electrical connector.

In some implementations, the slot defines an equal armed cross shape. In some implementations, the end effector of the robotic installer comprises two members configured to be inserted into the slot and expanded along one of two axes to thereby fix the two members therein and obtain movable control of the electrical connector. In some implementations, the two axes are perpendicular to each other to provide for both horizontal and vertical robotic installation of the electrical connector. In some implementations, the robotic installation feature defines a predefined hexagonal outer shape such that it is identifiable by the robotic installer.

In some implementations, the slot defines a hexagonal shape and at least two opposing base slots. In some implementations, the end effector comprises at least two members configured to be inserted into the slot and expanded through at least two of the at least two opposing base slots to thereby fix the at least two members therein and obtain movable control of the electrical connector. In some implementations, the slot defines four opposing base slots.

According to another aspect of the present disclosure, a method of using a robotic installer to install an electrical connector is presented. In one exemplary implementation, the method comprises: identifying, by the robotic installer, a robotic installation feature at least temporarily attached to or defined in an outer surface of a housing of the electrical connector, inserting, by the robotic installer, at least two members of an end effector of the robotic installer into a slot defined by the robotic installation feature, expanding, by the robotic installer, the at least two members of the end effector along at least one of two axes to thereby fix the at least two members therein and obtain movable control of the electrical connector, and installing, by the robotic installer, the electrical connector with a corresponding electrical connector.

In some implementations, installing the electrical connector with another electrical system includes engaging the electrical connector with a connector position assurance (CPA) feature of the corresponding electrical connector. In some implementations, the method further comprises upon engaging the electrical connector with the CPA feature of the corresponding electrical connector: retracting, by the robotic installer, the two members of the end effector along the one of the two axes, and removing, by the robotic installer, the two members of the end effector from the slot.

In some implementations, the slot defines an equal armed cross shape the two axes are perpendicular to each other to provide for both horizontal and vertical robotic installation of the electrical connector. In some implementations, the robotic installation feature defines a predefined hexagonal outer shape such that it is identifiable by the robotic installer.

In some implementations, the slot defines a hexagonal shape and at least two opposing base slots. In some implementations, the at least two members of the end effector are inserted into the slot and expanded through at least two of the at least two opposing base slots to thereby fix the at least two members therein and obtain movable control of the electrical connector. In some implementations, the slot defines four opposing base slots.

According to yet another aspect of the present disclosure, an electrical connector is presented. In one exemplary implementation, the electrical connector comprises a housing means defining an outer surface, a wire cable means at least partially disposed in the housing means, and a robotic installation feature means at least temporarily attached to or defined in the outer surface of the housing means, wherein the robotic installation feature means defines a slot means for interaction with by an end effector means of a robotic installer means during robotic installation of the electrical connector with a corresponding electrical connector.

In some implementations, the slot means defines an equal armed cross shape. In some implementations, the end effector means of the robotic installer means comprises two member means for insertion into the slot means and expanded along one of two axes to thereby fix the two members therein and obtain movable control of the electrical connector. In some implementations, the two axes are perpendicular to each other to provide for both horizontal and vertical robotic installation of the electrical connector.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
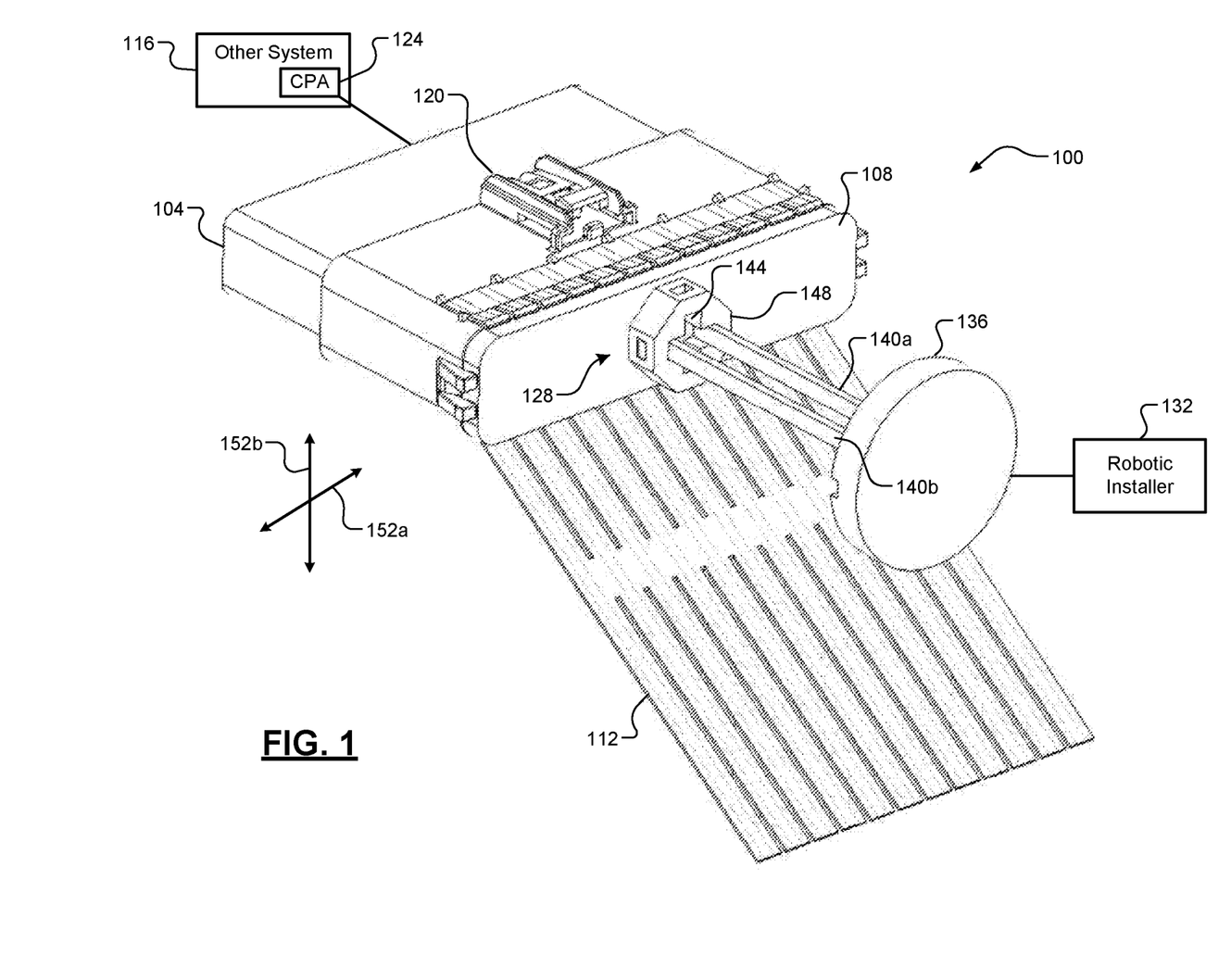
FIG. 1 illustrates a view of a first example electrical connector according to some implementations of the present disclosure.

Referring now to FIG. 1, a first example electrical connector 100 according to the principles of the present disclosure is illustrated. The connector 100 comprises a housing 104 defining an outer surface 108. The housing 104 has at least a portion of a wire cable 112 disposed therein. While a flat or band-type wire cable is illustrated, it will be appreciated that a single wire or other type of wire cable (e.g., a round wire cable) could be utilized. One end of the wire cable 112 is electrically connected to another electrical system or a corresponding electrical connector 116 by connecting one end of the housing 104 to the corresponding electrical connector 116 using connector position assurance (CPA) features 120, 124. As shown, this could include a clip 120 that connects to a complimentary other CPA feature 124. The connector 100 also comprises a robotic installation feature 128 at least temporarily attached to or defined in its outer surface 108. This robotic installation feature 128 could be temporarily and thus removable or detachable after robotic installation. Alternatively, the robotic installation feature 128 could be a permanent feature, which could be interacted multiple times (e.g., for robotic installation and subsequent robotic removal and re-installation).

The robotic installation feature 128 is configured to be interacted with by an end effector 136 of a robotic installer 132. In the illustrated configuration, the end effector 136 comprises two members 140a, 140b that are configured to be inserted in a slot 144 defined by the robotic installation feature. In the illustrated example, the slot 144 defines an equal armed cross shape (also commonly referred to as a plus sign (+) shape), but it will be appreciated that other slot shaped and end effector configurations could be utilized. The robotic installation feature 128 also defines an outer shape 148 that could be predefined and thus easily identifiable by a basic scanning system (not shown) of the robotic installer 132. In the illustrated example, the outer shape 148 is a hexagonal shape, but it will be appreciated that other shapes could be utilized. In the illustrated example, the two members 140a, 140b of the end effector 136 are inserted into the slot 144 and then expanded along one of two axes 152a, 152b to thereby fix the two members 140a, 140b therein and obtain movable control of the electrical connector 100. This movable control is obtained by the expansive force maintained by the members 140a, 140b within the slot 144. The equal armed cross shape configuration of the slot 144 and the movability of the members 140a, 140b along one of two different axes 152a, 152b allows for both horizontal and vertical robotic installation of the electrical connector 100. In one example implementation, there are channels extending from the slot 144 under the top surface of the robotic installation feature 128 and the members 140a, 140b each define an L-shape such that their distal ends can engage these channels.

Figure 2A:
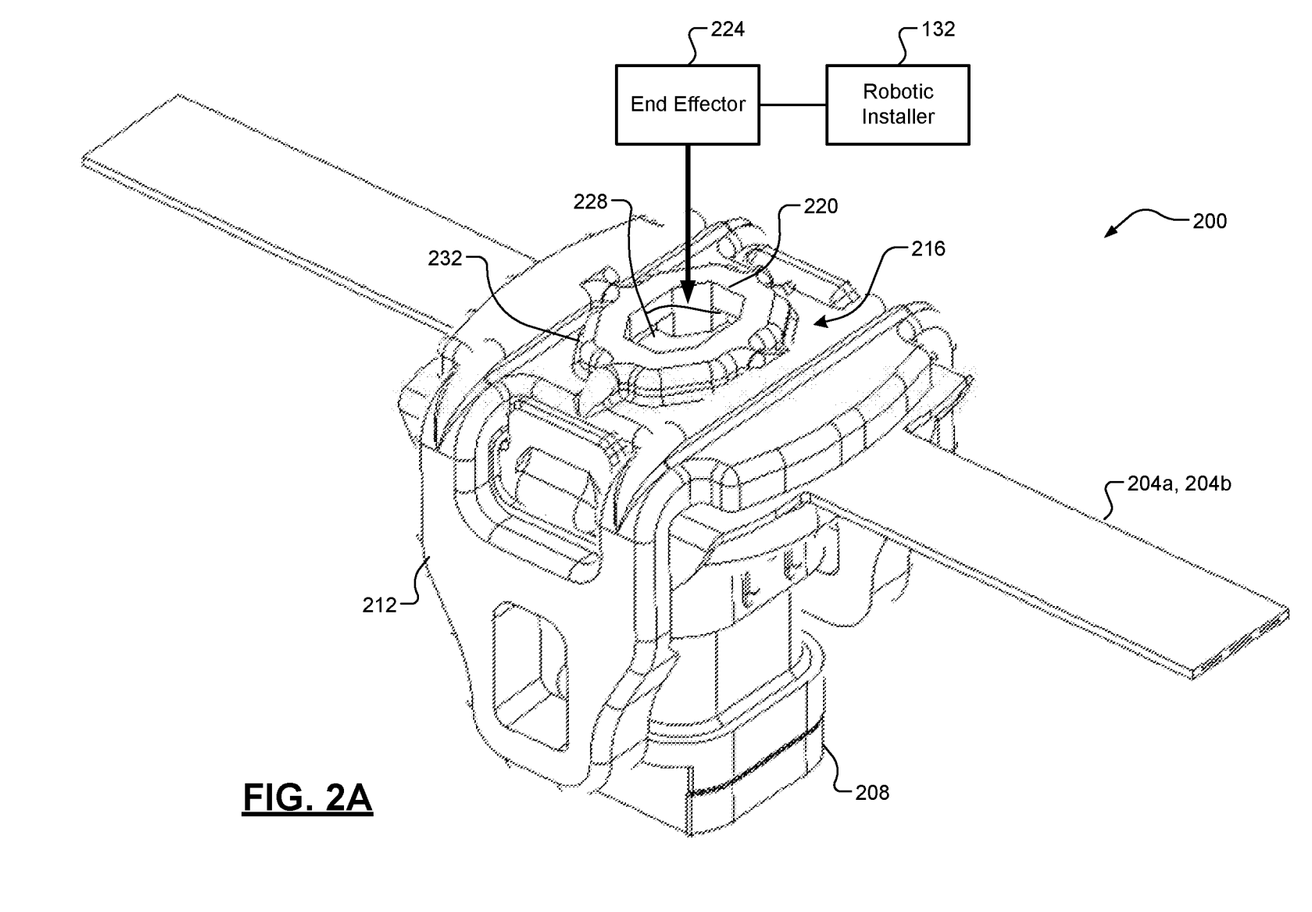
FIGS. 2A-2B illustrate views of a second example electrical connector according to some implementations of the present disclosure.
Figure 2B:
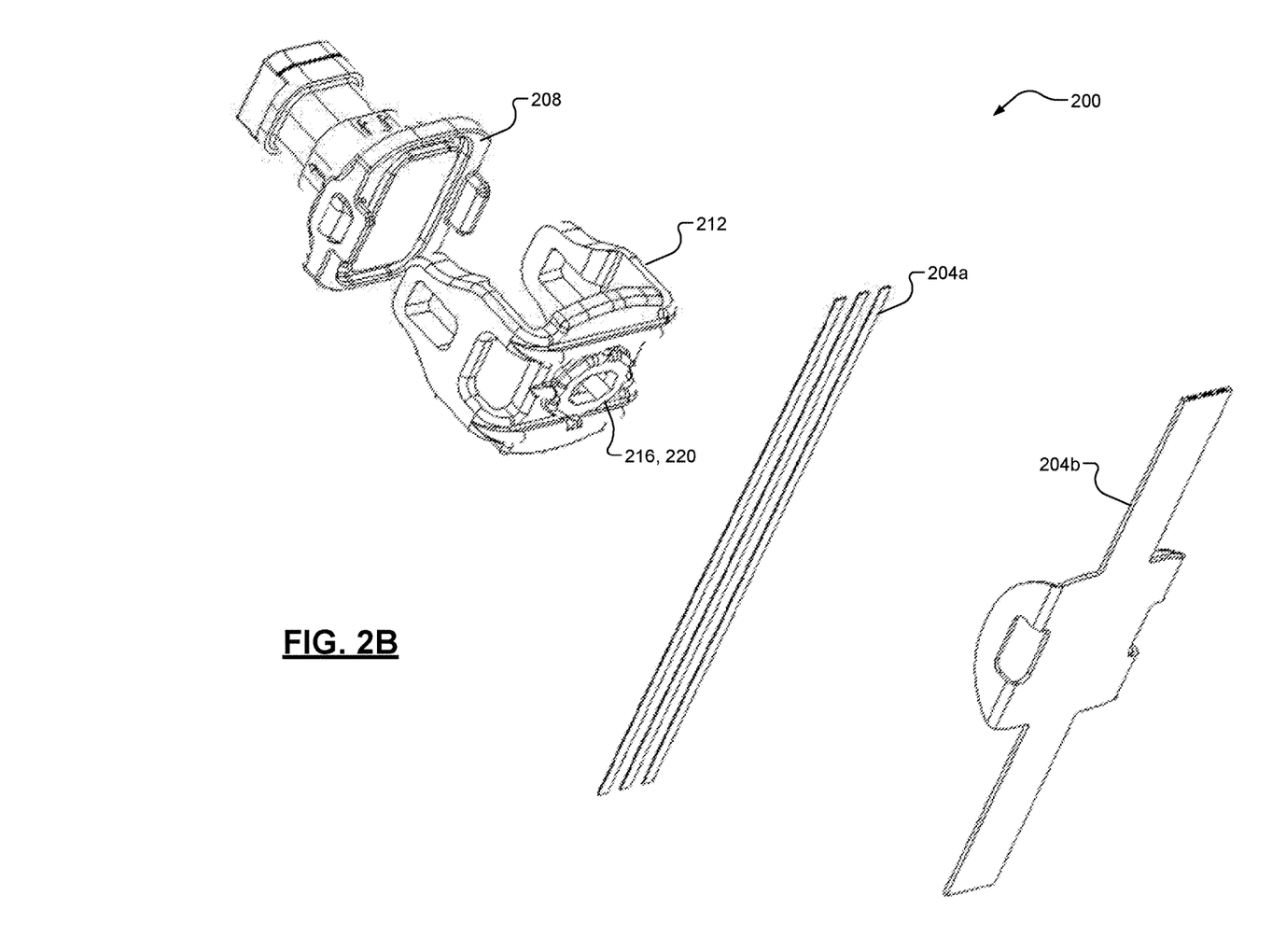

Referring now to FIGS. 2A-2B, a second example electrical connector 200 according to the principles of the present disclosure is illustrated. The electrical connector 200 is configured to electrically connect two wire cables 204a, 204b by compressing or sandwiching them together. While flat or band-type wire cables 204a, 204b are likely used in this configuration of the connector 200, it will be appreciated that single or multiple unshielded round-type wire cables could be utilized. A first member 208 interlocks with a second member 212 to thereby secure and electrically connect the wire cables 204a, 204b therein. The second member 212 also comprises a robotic installation feature 216, which defines a slot 220 that can be interacted with by an end effector 224 of the robotic installer 132. While the same robotic installer 132 from FIG. 1 is referenced, it will be appreciated that a different robotic installer could be utilized for this type of connector 200. The end effector 224 could also be the same as or similar to the end effector 136 of FIG. 1. In the illustrated example, the slot 220 defines four opposing base channels or slots 228. Thus, when two or more members (not shown) of the end effector 224 are inserted into the slot 220, they could be expanded through two or more of these base slots 228 to gain movable control of the electrical connector 200. The robotic installation feature 216 can also define a predefined outer shape (e.g., hexagonal shape 232 as shown) for easy identification by the robotic installer 132. In one example implementation, the two or more members of the end effector 224 each define an L-shape such that their distal ends can engage the base slots 228.

Figure 3:
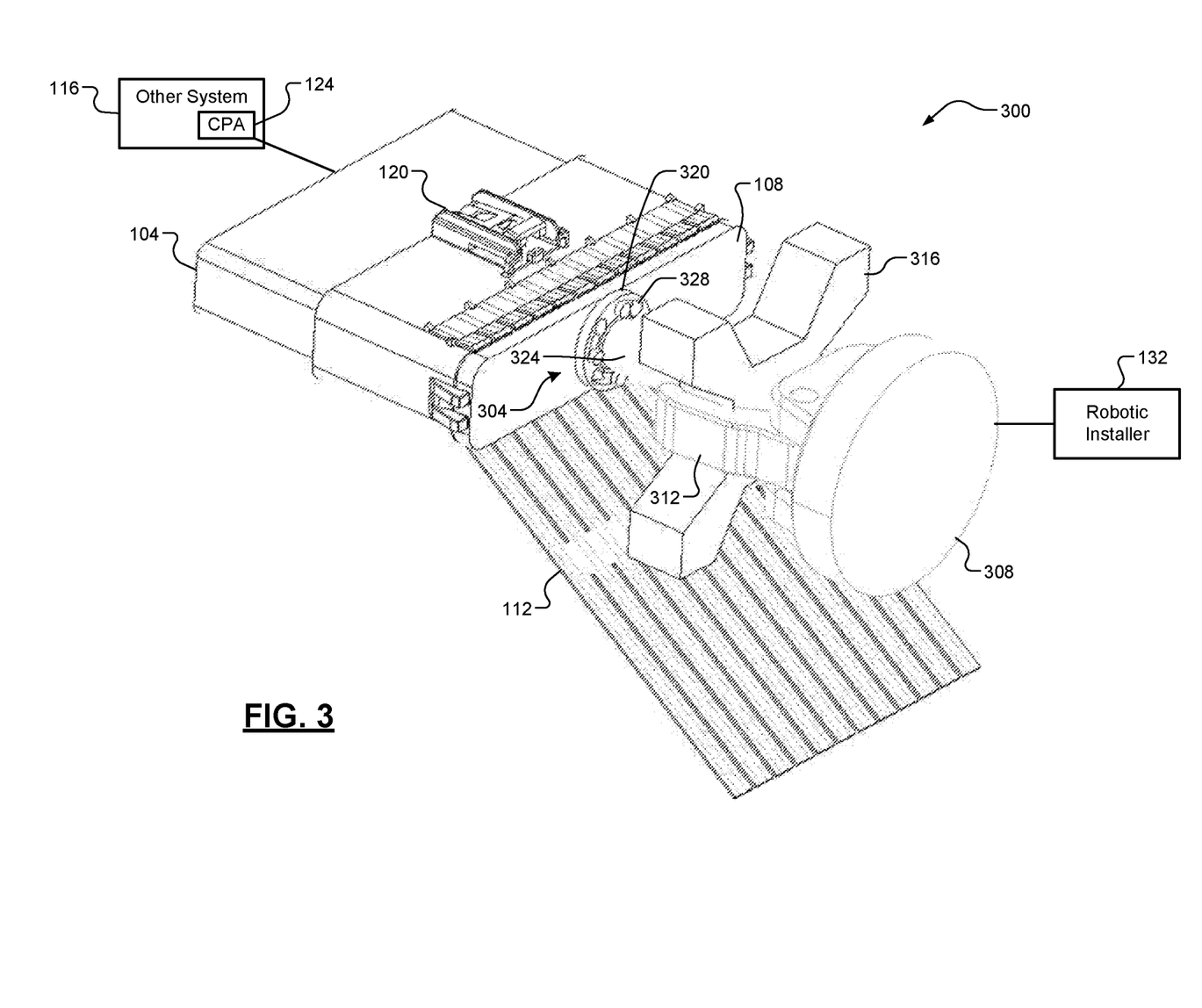
FIG. 3 illustrates a view of a third example electrical connector according to some implementations of the present disclosure.

Referring now to FIG. 3, a third example electrical connector 300 is illustrated. The electrical connector 300 comprises many of the same or similar components as illustrated in FIG. 1 and as described in greater detail above. This connector 300, however, comprises a different robotic installation feature 304. In this illustrated example, an end effector 308 of the robotic installer 132 comprises a gripping or grasping member 312 (e.g., a clamp) that is configured to grip or grasp an X-shaped gripping or grasping feature 316 that is attached to the outer surface 108 of the connector 300 via a base member 320 and a shaft 324. While an X-type shape is shown for the gripping or grasping feature is illustrated, it will be appreciated that other shapes could be utilized (a round bar, a flat bar, a circular disc, an equal armed cross shape, a t-shape, etc.). Similarly, while keyhole slots 328 are shown for coupling or attaching the shaft 324 to the base member 320 and to the outer surface 108 of the connector 300, it will be appreciated that other attachment configurations and/or other shaft configurations could be utilized.

Methods for robotic installation of the connectors 100, 200, 300 illustrated and described herein generally involve the following steps: (1) providing the connector, (2) identifying, by the robotic installer, the robotic installation feature, (3) gaining movable control, by the robotic installer via its end effector, the connector, (4) installing, by the robotic installer, the connector with another electrical system (e.g., another electrical connector) via their respective CPA features, and (5) disengaging, by the robotic installer via its end effector, from the robotic installation feature of the connector to complete the installation process. For automotive applications, for example only, these electrical connectors could be used to connect a central controller or distributed controllers to respective electrical devices or systems (e.g., RADAR, LIDAR, electric traction motors, and the like).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical connection system, comprising:
   an electrical connector comprising a housing and a wire cable at least partially disposed in the housing, wherein the housing includes an outer surface and a peripheral surface, the outer surface of the housing defining a slot, the peripheral surface completely surrounding the slot; and
   a robotic end effector comprising two members configured for (i) insertion into the slot along a first axis and (ii) expansion apart from each other along a second axis perpendicular to the first axis within the slot,
   wherein the expansion of the two members within the slot allows the robotic end effector to gain control of and move the electrical connector for an installation operation.

2. The electrical connection system of claim 1, wherein the two members are further configured for (iii) contraction towards each other along the second axis within the slot to release any frictional engagement the electrical connector and the two members and free the electrical connector from control and movement by the robotic end effector.

3. The electrical connection system of claim 1, wherein the slot defines a cross shape having a first slot and a second slot perpendicular to the first slot.

4. The electrical connection system of claim 3, wherein the first slot defines a first slot axis, and the second slot defines a second slot axis perpendicular to the first slot axis, and wherein one of the first slot axis or the second slot axis is aligned with the second axis.

5. The electrical connection system of claim 4, wherein the first slot is configured to translatably-receive the robotic end effector for translation along the first slot axis, and wherein the second slot is configured to translatably-receive the robotic end effector for translation along the second slot axis.

6. The electrical connection system of claim 1, wherein the housing further defines a hexagonal outer shape identifiable configured for identification by a robotic identifier associated with the robotic end effector.

7. An electrical connection system, comprising:
   an electrical connector comprising a housing and a wire cable at least partially disposed in the housing, wherein the housing includes an outer surface and a peripheral surface, the outer surface of the housing defining a robotic installation means for receiving a robotic end effector, the peripheral surface completely surrounding the robotic installation means,
   wherein the robotic end effector includes two member means for (i) insertion into the robotic installation means along a first axis and (ii) expansion apart from each other along a second axis perpendicular to the first axis within the robotic installation means, and
   wherein the expansion of the two member means within the robotic installation means allows the robotic end effector to gain control of and move the electrical connector for an installation operation.

8. The electrical connection system of claim 7, wherein the two member means are further for (iii) contraction towards each other along the second axis within the robotic installation means to release any frictional engagement between the electrical connector and the two members means and free the electrical connector from control and movement by the robotic end effector.

9. The electrical connection system of claim 7, wherein the robotic installation means defines a cross shape having a first slot and a second slot perpendicular to the first slot.

10. The electrical connection system of claim 9, wherein the first slot defines a first slot axis, and the second slot defines a second slot axis perpendicular to the first slot axis, and wherein one of the first slot axis or the second slot axis is aligned with the second axis.

11. The electrical connection system of claim 10, wherein the first slot is configured to translatably-receive the robotic end effector for translation along the first slot axis, and wherein the second slot is configured to translatably-receive the robotic end effector for translation along the second slot axis.

12. The electrical connection system of claim 7, wherein the housing further defines a hexagonal outer shape configured for identification by a robotic identifier means associated with the robotic end effector.

13. A method for connecting an electrical connector with a robotic end effector, the electrical connector comprising a housing and a wire cable at least partially disposed in the housing, wherein the housing includes an outer surface and a peripheral surface, the outer surface of the housing defining a slot, the peripheral surface completely surrounding the slot, the robotic end effector comprising a first member and a second member, the method comprising:
   inserting the first member and the second member into the slot along a first axis and completely surrounding a portion of the first member and a portion of the second member with the peripheral surface; and
   moving the first member away from the second member along a second axis perpendicular to the first axis within the slot to allow the robotic end effector to gain control of and move the electrical connector for an installation operation.

14. The method of claim 13, further comprising contracting the first member and the second member towards each other along the second axis within the slot to release any frictional engagement between the electrical connector and the first member and the second member and free the electrical connector from control and movement by the robotic end effector.

15. The method of claim 13, wherein the slot defines a cross shape having a first slot and a second slot perpendicular to the first slot.

16. The method of claim 15, wherein the first slot defines a first slot axis, and the second slot defines a second slot axis perpendicular to the first slot axis, and wherein one of the first slot axis or the second slot axis is aligned with the second axis.

17. The method of claim 16, wherein the first slot is configured to translatably-receive the robotic end effector for translation along the first slot axis, and wherein the second slot is configured to translatably-receive the robotic end effector for translation along the second slot axis.

18. The method of claim 13, wherein the housing further defines a hexagonal outer shape, the method further comprising identifying, by a robotic identifier associated with the robotic end effector, the hexagonal outer shape.

* * * * *